(12) United States Patent
Chopra et al.

(10) Patent No.: US 9,348,569 B1
(45) Date of Patent: May 24, 2016

(54) METHOD AND SYSTEM FOR A CONFIGURABLE AUTOMATION FRAMEWORK

(75) Inventors: Shelesh Chopra, Bangalore (IN); Ankit Gupta, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 59 days.

(21) Appl. No.: 13/610,474

(22) Filed: Sep. 11, 2012

(51) Int. Cl.
| G06F 9/44 | (2006.01) |
| G06F 11/20 | (2006.01) |
| G06F 11/00 | (2006.01) |
| G06F 9/45 | (2006.01) |

(52) U.S. Cl.
CPC . *G06F 8/52* (2013.01); *G06F 9/443* (2013.01)

(58) Field of Classification Search
CPC ........... G06F 9/44; G06F 11/36; G06F 11/20; G06F 11/00; G06F 17/30; G06F 8/00
USPC ......... 717/124; 714/38, 32; 707/640
See application file for complete search history.

(56) References Cited

U.S. PATENT DOCUMENTS

| 5,983,316 | A | * | 11/1999 | Norwood ...................... 711/112 |
| 7,165,189 | B1 | * | 1/2007 | Lakkapragada et al. ........ 714/31 |
| 7,694,181 | B2 | * | 4/2010 | Noller et al. ............... 714/38.11 |
| 2003/0061399 | A1 | * | 3/2003 | Wagener et al. .............. 709/321 |
| 2007/0028217 | A1 | * | 2/2007 | Mishra et al. ................. 717/124 |
| 2008/0092119 | A1 | * | 4/2008 | Sweis ........................... 717/124 |
| 2008/0183775 | A1 | * | 7/2008 | Prahlad et al. ................ 707/204 |
| 2009/0307763 | A1 | * | 12/2009 | Rawlins et al. .................... 726/5 |
| 2013/0311827 | A1 | * | 11/2013 | Drory et al. ..................... 714/32 |

OTHER PUBLICATIONS

"Chapter 3 Solaris Volume Manager Administration.pdf", Oracle, 2010, pp. 1-7.*

* cited by examiner

*Primary Examiner* — Chat Do
*Assistant Examiner* — Devayani R Talukdar
(74) *Attorney, Agent, or Firm* — Dergosits & Noah LLP; Todd A. Noah

(57) ABSTRACT

A configurable automation framework includes a computer that executes an execution driver, a parser, a volume population engine, a configuration checker, an execution engine, and a logger. The execution driver receives user input that specifies configuration options and populates a test case suite based on each combination of the configuration options. The configuration options include operating system options, multipathing software options, volume options, array options, snapshot type options, and/or dataset options. The parser parses the test case to identify script instructions to test an application for each combination. The volume population engine creates volumes based on user input that specifies volume options. The execution engine executes the script instructions to test the application if the configuration checker determines that the computer is setup for each combination. The logger logs a result of executing the script instructions for each combination and outputs the result.

20 Claims, 3 Drawing Sheets

METHOD AND SYSTEM FOR A CONFIGURABLE AUTOMATION FRAMEWORK

BACKGROUND

Test automation is the use of software to control the execution of tests, the comparison of actual outcomes to predicted outcomes, the setting up of test preconditions, and other test control and test reporting functions. An automation framework is not a single tool to perform some specific testing task, but a set of tools that provide support for automated software testing in a unified manner, thereby providing a common platform for an automation engineer to do a job. If there is change to any test case for an application that is being tested, only the test case file needs to be updated, such that the driver script and startup script remain the same. The automation framework integrates the function libraries, test data sources, object details and various reusable modules. The automation framework is responsible for defining the format in which to express expectations, creating a mechanism to drive the application being tested, executing the tests, and reporting the results. Typically an automation framework resides on a host computer and includes a test initializer, a script parser, a script execution engine, and a logger that logs and reports the test results.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
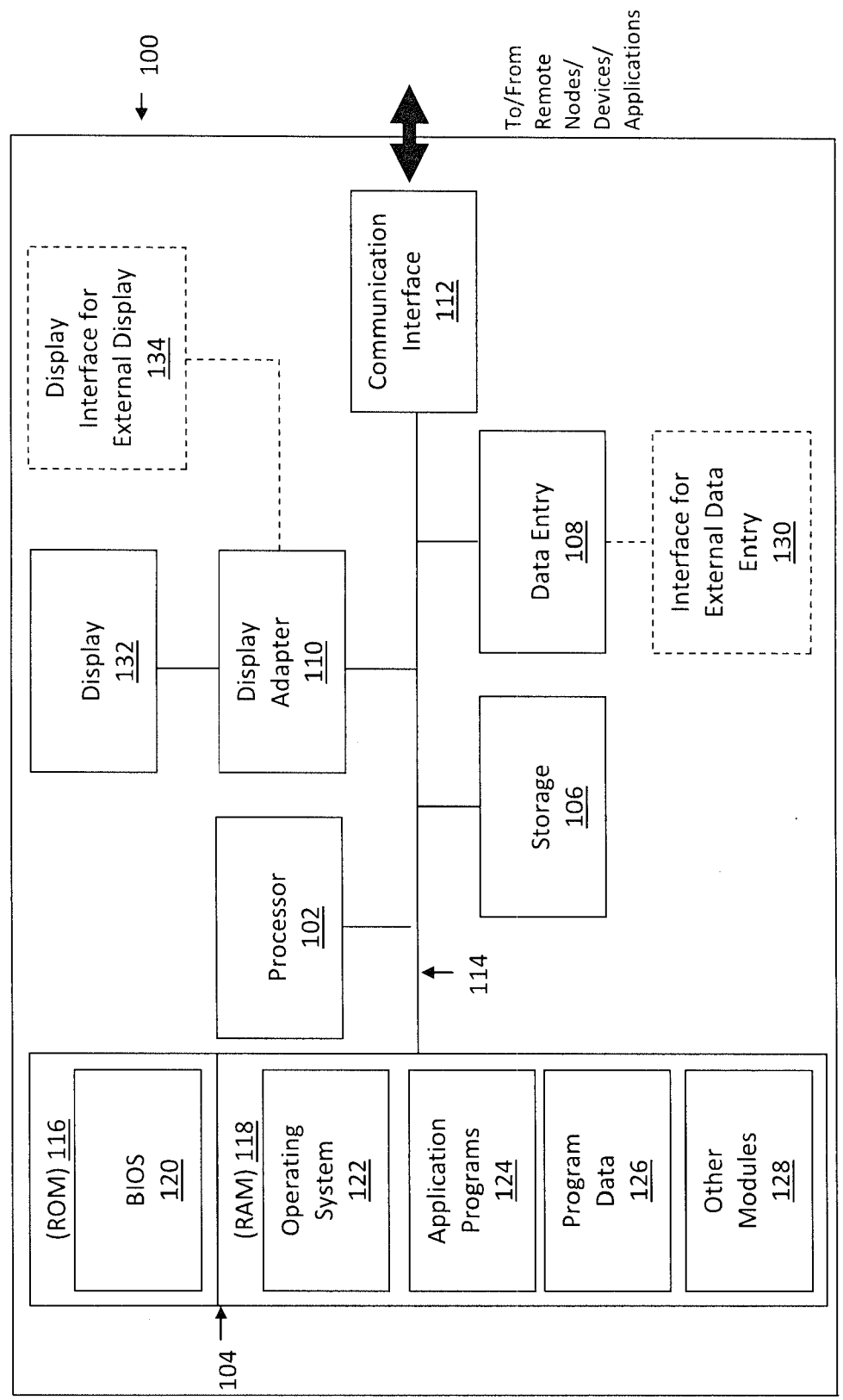
FIG. 1 is a block diagram illustrating an example hardware device in which the subject matter may be implemented.

Testing an application is complex when automation frameworks have to directly or indirectly interface with different third party applications, thereby requiring different configurations for the testing of applications. For example, an automation framework needs to be configured for three different operating systems if an application to be tested can be executed by the three different operating systems. Many prior art automation frameworks include a significant amount of hard coding of business logic in the test scripts based on the assumption that each different configuration for interfacing with a third party application is a unique test case, even though each different configuration may be a different instance of the same test case. For example, if a user wants to test an application using a prior art automation framework for each combination of three dataset types (a small dataset, a medium dataset, and a large dataset) and three volume types (a managed volume, an unmanaged volume, and a raw volume), the user may have to modify the business logic in the test scripts to execute nine different test cases even though only one test case will actually be executed for nine different combinations of configurations. This hard coding of business logic results in reduced maintainability and scalability for such prior art automation frameworks. Every time that a new test configuration has to be added to the list of configurations for which a prior art automation frameworks tests an application, the user may have to modify the test script to create new business logic for a new test case. This prior art solution is not efficient when an automation framework is actually executing the same test script for multiple different configurations.

The subject matter presented herein provides a configurable automation framework that offers solutions to prior art problems. A configurable automation framework includes a computer that executes an execution driver, a parser, an optional volume population engine, an optional data population engine, a configuration checker, an execution engine, and a logger. The execution driver receives user input that specifies configuration options, and populates a test case suite based on each combination of the configuration options, with the configuration options including operating system options, multipathing software options, volume options, array options, snapshot type options, and/or dataset options. For example, the execution driver populates a test case suite with nine instances of a single test case, in which the nine instances include each combination of three dataset types (a small dataset, a medium dataset, and a large dataset) and three volume types (a managed volume, an unmanaged volume, and a raw volume) specified by a user. The parser parses a test case from the test case suite to identify script instructions to test an application for each combination of configuration options, such as each of the nine combinations of dataset/volume configuration options. Continuing this example, the volume population engine creates volumes based on user input that specifies three volume options while the data population engine creates datasets based on user input that specifies three dataset options. The execution engine executes the script instructions to test the application for each combination of configuration options if the configuration checker determines that the computer is setup for each combination of configuration options. For example, the execution engine executes the script instructions to test the application for each of the nine dataset/volume combinations because the configuration checker determined that the computer is setup for each of the nine dataset/volume combinations. The logger logs a result of executing the script instructions for each combination of configuration options and outputs the result via an output device. For example, the logger outputs the results that indicate that the test of the application failed only for the combination of the large dataset and the raw volume option. Configuring the automation framework to enable the user to add or subtract the testing of different configurations by simply modifying an easily accessible configuration file instead of modifying business logic in the test script produces a configurable automation framework that is optimized, scalable, portable, and more manageable, thereby providing a better total customer experience.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for a configurable automation framework.

Testing an application is complex when automation frameworks have to directly or indirectly interface with different third party applications, thereby requiring different configurations for the testing of applications. Many prior art automation frameworks include a significant amount of hard coding of business logic in the test scripts to support different configurations. This hard coding of business logic results in reduced maintainability and scalability for such prior art automation frameworks. Every time that a new test configuration has to be added to the list of configurations for which a prior art automation frameworks tests an application, the user may have to modify the test script to include new business logic for a new test case. This prior art solution is not efficient when an automation framework is actually executing the same test script for multiple configurations.

Embodiments herein provide a configurable automation framework that offers solutions to prior art problems. Configuring the automation framework to enable the user to add or subtract the testing of different configurations by simply modifying an easily accessible configuration file instead of modifying business logic in the test script produces a configurable automation framework that is optimized, scalable, portable, and more manageable, thereby providing a better total customer experience.

Figure 2:
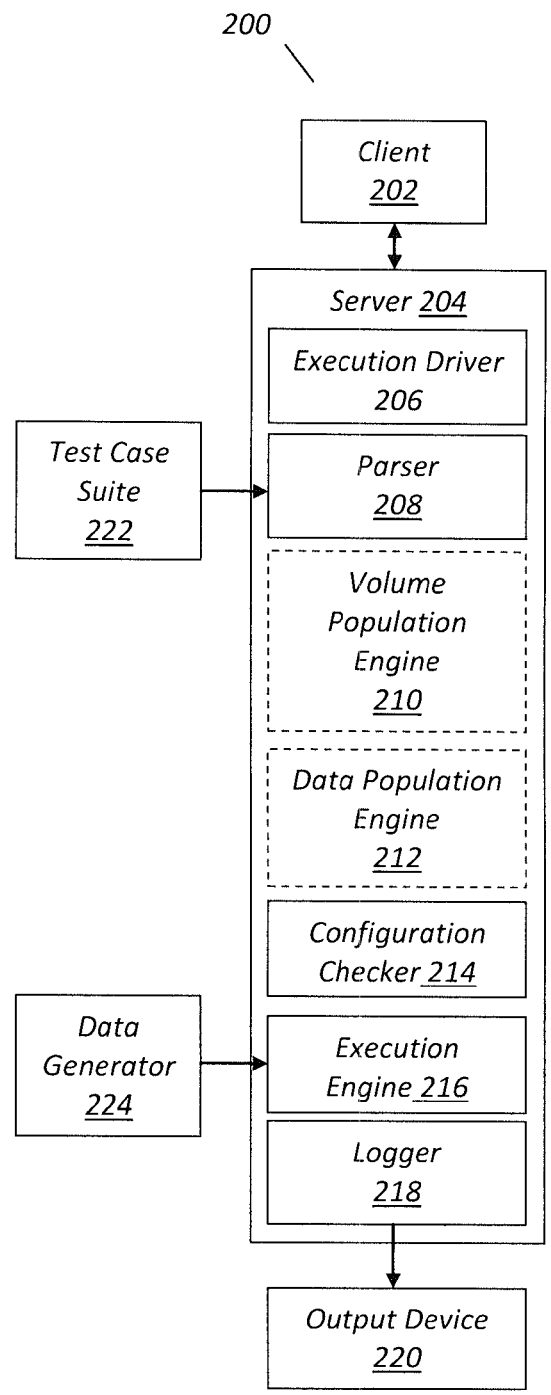
FIG. 2 illustrates a block diagram of an example system for a configurable automation framework, under an embodiment.

FIG. 2 illustrates a block diagram of a system that implements a configurable automation framework, under an embodiment. The configurable automation framework may be portable, such that it can test applications in many different environments. The configurable automation framework is scalable, such that the configurable automation framework may test an application on anywhere from one computer to thousands of computers. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of data for different client users.

In an embodiment, the system 200 represents a cloud computing system that includes a client 202 and a server 204 that are provided by a hosting company. Although FIG. 2 depicts the system 200 with one client 202 and one server 204, the system 200 may include any number of clients 202 and any number of servers 204. Each of the client 202 and the server 204 is substantially similar to the system 100 depicted in FIG. 1. The client 202 enables a user to communicate with the server 204, which functions as a configurable automation framework by executing a execution driver 206, a parser 208, an optional volume population engine 210, an optional data population engine 212, a configuration checker 214, an execution engine 216, and a logger 218.

The execution driver 206 receives user input that specifies configuration options, where the configuration options include operating system options, multipathing software options, volume options, array options, snapshot type options, and/or dataset options. The configuration options selected by the user are stored in a configuration file that is easily accessible and modifiable by the user. For example, a user inputs, via the client 202, configuration options into a configuration file, specifying three dataset types (a small dataset, a medium dataset, and a large dataset) and three volume types (a managed volume, an unmanaged volume, and a raw volume).

Examples of the operating system options include the Windows® operating system, the Unix® operating system, and the Linux® operating system. Examples of the multipathing software options include Powerpath® software, Veritas® dynamic multipathing software, and multipath input/output (MPIO) software. Examples of the volume options include a managed volume, an unmanaged volume, and a raw volume. A managed volume, or file system, is a volume with an installed volume manager, an unmanaged volume is a volume with a shared volume manager, and a raw volume is a volume without a volume manager. Examples of the array options include a Symmetrix® array, a Clarion® array, and an EMC Recoverpoint® array. Examples of the snapshot type options include a clone snapshot, a snaps snapshot, and a business continuance volume (BCV) snapshot. Examples of the dataset options include a small dataset, a medium dataset, and a large dataset, where the datasets are differentiated from each other based on the number of directories to be created in their datatrees, a depth of their datatrees, a number of files to be created in each directory, and a size of each file to be created.

The execution driver 206 populates the test case suite 222 based on combinations of configuration options. For example, the execution driver 206 executes a framework driver script which receives the configuration options from a framework trigger script that receives the configuration options from user input, and populates the test case suite 222 with nine instances of a single test case, in which the nine instances correspond to each combination of three dataset types (a small dataset, a medium dataset, and a large dataset) and three volume types (a managed volume, an unmanaged volume, and a raw volume) specified by a user. In this example, the nine instances that correspond to each combination of the configuration options include a small dataset with a managed volume, a small dataset with an unmanaged volume, a small dataset with a raw volume, a medium dataset with a managed volume, a medium dataset with an unmanaged volume, a medium dataset with a raw volume, a large dataset with a managed volume, a large dataset with an unmanaged volume, and a large dataset with a raw volume. Other configuration options processed by the execution driver 206 executing the framework driver script include the product installation location, the log files location, and the test cases to be executed.

A user of the system 200 may use a command line interface, which is a text-only interface, to initiate the configurable automation framework via the client 202. A command line interface may be used whenever a large vocabulary of commands or queries, coupled with a wide range of options, can be entered more rapidly as text than can be entered with a pure graphic user interface (GUI).

The parser 208 retrieves a test case that corresponds to the user-selected combination of configuration options from the test case suite 222, and parses the test case to identify script instructions to test an application for each combination of configuration options. For example, the parser 208 parses a test case from the test case suite 222 to identify script instructions to test an application for each of the nine combinations of dataset/volume configuration options. The test case suite 222 includes lists of text cases to be executed. The test cases include parameterization scripts that provide parameters to the test script to be executed to test an application, enabling the script for a single test case to be used to test the application for each of the configuration options. The parameterization scripts may be used to specify some options which either perform or skip specific operations for a particular script.

The volume population engine 210 creates volumes based on user input that specifies volume options. For example, the volume population engine 210 creates three volumes based on user input that specifies the volume options for a managed volume, an unmanaged volume, and a raw volume. The volume population engine 210 uses Veritas® volume manager or logical volume manager/logical disk manager commands to create volumes based on the mount points taken from the configuration file.

The data population engine 212 creates datasets based on user input that specifies dataset options. For example, the data population engine 212 creates three datasets based on user input that specifies the small, medium, and large datasets, where the size and type of data is specified by the configuration file.

The configuration checker 214 determines whether the server 204 is setup for each combination of configuration options. For example, the configuration checker 214 determines that the server 204 is setup for all nine volume/dataset combinations.

The execution engine 216 executes the script instructions to test the application for each combination of configuration options if the configuration checker 214 determines that the computer is setup for each combination of configuration options. For example, the execution engine 216 executes the script instructions to test the application for each of the nine dataset/volume combinations because the configuration checker determines that the computer is setup for each of the nine dataset/volume combinations. The execution engine 216 includes a test iterator that traverses through all of the applicable instances and applies the same business logic to all of the combinations of configurations. For example, if a user selected three operating system options, three multi-path software options, three volume options, three array options, three snapshot options, and three dataset options, the test iterator would traverse through 729 instances (three options multiplied by three options multiplied by three options multiplied by three options multiplied by three options multiplied by three options) for the same test case. In contrast to executing one test case 729 times, prior art automation frameworks would have to be hard coded to execute the same test case as 729 different test cases. Comparing the results of 729 different test cases would be unwieldy, whereas identifying whether one test case executed correctly for 729 different instances would be more efficient for reporting purposes.

The execution engine 216 may use data from the data generator 224 to execute a script instruction. The data generator 224 may be a file system data generator, a SQL data generator, an exchange data generator, a Sharepoint data generator, and/or an Oracle data generator.

The logger 218 logs a result of executing the script instructions for each combination of configuration options. For example, the logger 218 logs the results, which may be stored in a user-configured repository, that indicate that the test of the application failed only for the combination of the large dataset and the raw volume option.

The logger 218 outputs the result via the output device 220. For example, the logger 218 outputs a report that indicates that the test of the application failed only for the combination of the large dataset and the raw volume option. The reports and notifications may enable precise identification of which combination of configurations failed to execute the application properly, which script instruction identified the failure, and when the failure occurred within the sequence of script instructions. If the execution of a particular script instruction failed, was unsupported, or did not run, the batch execution of the application testing does not stop because the server 204 may continue the processing of the next script instruction in the test case. Configuring the automation framework to enable the user to add or subtract the testing of different configurations by simply modifying an easily accessible configuration file instead of modifying business logic in the test script produces a configurable automation framework that is optimized, scalable, portable, and more manageable, thereby providing a better total customer experience.

Figure 3:
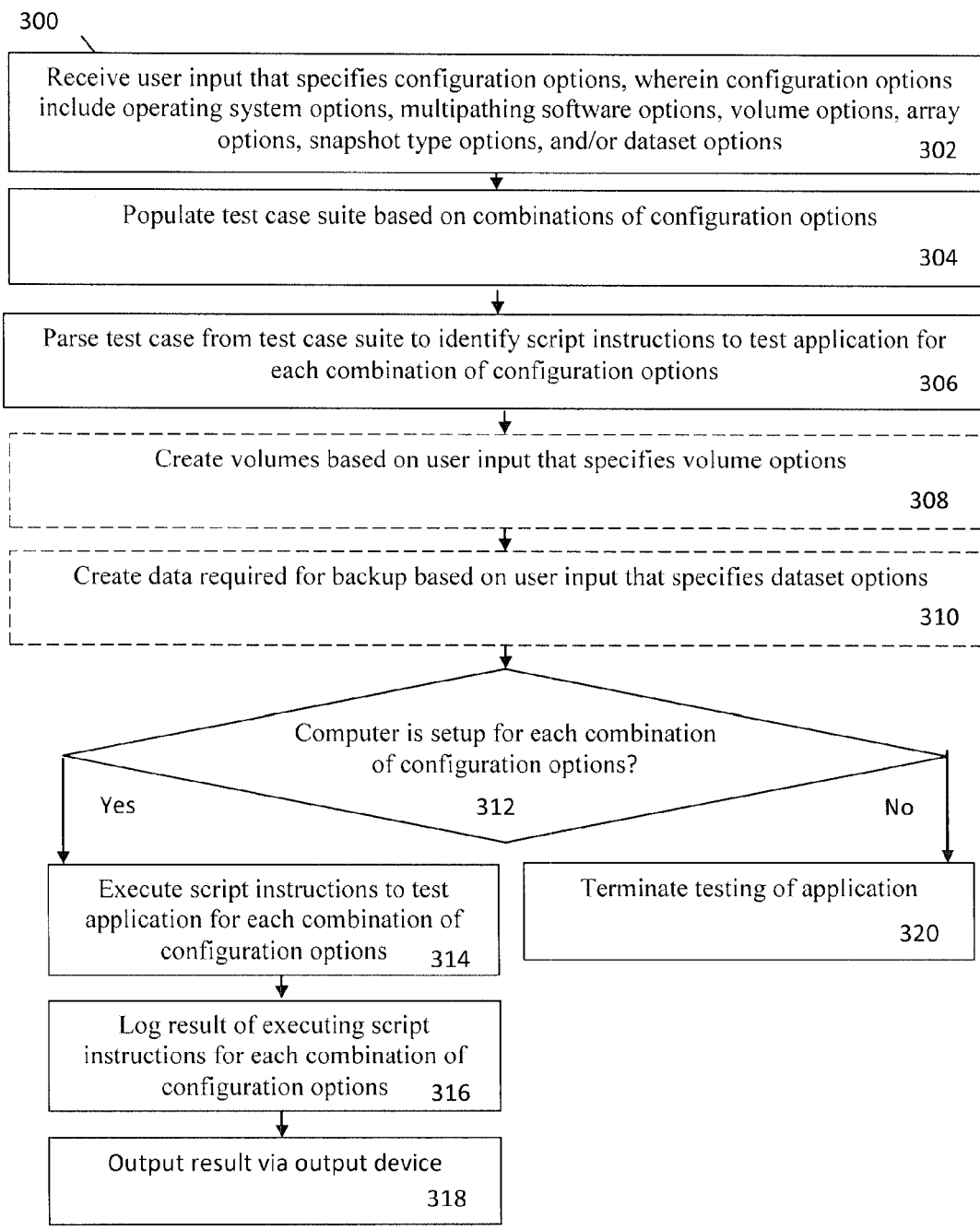
FIG. 3 is a flowchart that illustrates a method of a configurable automation framework, under an embodiment.

FIG. 3 is a flowchart that illustrates a method of a configurable automation framework. Flowchart 300 illustrates method acts illustrated as flowchart blocks for certain steps involved in and between the client 202 and the server 204 of FIG. 2.

User input that specifies configuration options is received, wherein configuration options include operating system options, multipathing software options, volume options, array options, snapshot type options, and/or dataset options, act 302. For example, the execution driver 206 receives user input that specifies three volume options and three dataset options.

A test case suite is populated based on combinations of configuration options, act 304. For example, the execution driver 206 populates the test case suite 222 based on nine volume/dataset combinations.

A test case from a test case suite is parsed to identify script instructions to test application for each combination of configuration options, act 306. For example, the parser 208 parses a test case from the test case suite 222 to identify script instructions to test application for nine volume/dataset combinations.

Volumes are optionally created based on user input that specifies volume options, act 308. For example, the volume population engine 210 uses Veritas® volume manager commands to create a managed volume, an unmanaged volume, and a raw volume.

Data required for backup is optionally created based on user input that specifies dataset options, act 310. For example, the data population engine 212 creates a small dataset, a medium dataset, and a large dataset.

A determination is made whether a computer is setup for each combination of the configuration options, act 312. For example, the configuration checker 214 determines whether the server 204 is setup for all nine volume/dataset combinations. If the configuration checker 214 determines that the computer is setup for each combination of the configuration options, Flowchart 300 continues to act 314. If the configuration checker 214 determines that the computer is not setup for each combination of the configuration options, Flowchart 300 proceeds to act 320.

Script instructions are executed to test an application for each combination of the configuration options, act 314. For example, the test iterator causes the execution engine 216 to execute script instructions to test an application for all nine volume/dataset combinations.

A result of executing script instructions is logged for each combination of the configuration options, act 316. For example, the logger 218 logs a result that indicates that the test of the application failed only for the combination of the large dataset and the raw volume option.

A result is output via an output device, act 318. For example, the logger 218 outputs a report via the output device 220 that indicates that the test of the application failed only for the combination of the large dataset and the raw volume option.

Testing of an application is terminated, act 320. For example, the configuration checker 214 terminates the testing of an application.

Although FIG. 3 depicts the acts 302-320 occurring in a specific order, the acts 302-320 may occur in another order. The configurable automation framework described herein enables a user to add or subtract the testing of different configurations by simply modifying an easily accessible configuration file instead of modifying business logic in the test script, producing a configurable automation framework that is optimized, scalable, portable, and more manageable, thereby providing a better total customer experience.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for a configurable automation framework, the system comprising:
   one or more processors; and
   a non-transitory computer readable medium storing a plurality of instructions, which when executed, cause the one or more processors to:
      receive user input that specifies a plurality of configuration options;
      populate a test case suite, the populating comprising generating an instance of a test case for every combination of the specified configuration options, wherein each combination of the specified configuration options comprise at least two of the specified configuration options and wherein the specified configuration options include operating system options, multipathing software options, volume options, array options, snapshot type options, and dataset options, wherein the dataset options comprise at least one of a small dataset, a medium dataset, and a large dataset that are differentiated from each other based on a number of directories to be created in a datatree, a depth of the datatree, a number of files to be created in each directory, and a size of each file to be created;
      parse the test case from the test case suite to identify script instructions to test an application for each combination of the configuration options;
      create volumes based on received user input that specifies selection from volume options, wherein the selected volume options comprise at least two of a managed volume, an unmanaged volume, and a raw volume;
      determine if the computer is setup for each combination of the specified configuration options, including the selected volume options;
      execute the identified script instructions to test the application for each combination of the specified configuration options, including the selected volume options, in response to a determination that the computer is setup for each combination of the specified configuration options, the executing comprising traversing the generated instances of the test case;
      log a result of executing the script instructions for each combination of the specified configuration options, including the selected volume options, and output the result via an output device.

2. The system of claim 1, wherein the configuration options specified by user input are stored in a configuration file.

3. The system of claim 1, wherein the snapshot type options comprise at least one a clone snapshot, a snaps snapshot, and a business continuance volume snapshot.

4. The system of claim 1, wherein the test case includes parameterization scripts that provide parameters to a test script to be executed to test the application for each combination of configuration options.

5. The system of claim 1 further comprising instructions, which when executed, cause the one or more processors to create data required for backup based on user input that specifies dataset options.

6. The system of claim 1, further comprising instructions, which when executed, cause the one or more processors to terminate testing of the application in response to a determination that the computer is not setup for each combination of the configuration options.

7. The system of claim 1, wherein execution of the instructions to receive user input and populate a test case suite based on each combination of the configuration options is initiated via a command line interface.

8. The system of claim 1 further comprising instructions, which when executed, cause the one or more processors to generate application test data for the computer.

9. The system of claim 1, further comprising instructions, which when executed, cause the one or more processors to traverse through all applicable instances to apply identical business logic to each combination of configuration options.

10. The system of claim 1, wherein the result identifies which combination of configurations failed to execute the application properly, which script instruction identified a failure, and when the failure occurred within a sequence of script instructions.

11. A computer-implemented method for a configurable automation framework, the method comprising:
receiving user input that specifies a plurality of configuration options, wherein each combination of the specified configuration options comprise at least two of the specified configuration options and wherein the specified configuration options include operating system options, multipathing software options, volume options, array options, snapshot type options, and dataset options, wherein the dataset options comprise at least one of a small dataset, a medium dataset, and a large dataset that are differentiated from each other based on a number of directories to be created in a datatree, a depth of the datatree, a number of files to be created in each directory, and a size of each file to be created;
populating a test case suite, the populating comprising generating an instance of a test case for each combination of the specified configuration options;
parsing the test case from the test case suite to identify script instructions to test an application for each combination of the configuration options;
creating volumes based on received user input that specifies selection from volume options, wherein the selected volume options comprise at least two of a managed volume, an unmanaged volume, and a raw volume;
creating data required for backup based on user input that specifies dataset options;
determining if a computer is setup for each combination of the specified configuration options, including the selected volume options;
executing the identified script instructions to test the application for each combination of the specified configuration options, including the selected volume options, in response to a determination that the computer is setup for each combination of the specified configuration options, the executing comprising traversing the generated instances of the test case;
logging a result of executing the script instructions for each combination of the specified configuration options, including the selected volume options; and
outputting the result via an output device.

12. The method of claim 11, wherein the configuration options specified by user input are stored in a configuration file.

13. The method of claim 11, wherein the test case includes parameterization scripts that provide parameters to a test script to be executed to test the application for each combination of configuration options.

14. The method of claim 11 further comprising terminating testing of the application in response to a determination that the computer is not setup for each combination of the configuration options.

15. A computer program product comprising a non-transitory computer-readable medium having a computer-readable program code embodied therein to be executed by one or more processors, the program code including instructions to:
receive user input that specifies a plurality of configuration options, wherein each combination of the specified configuration options comprise at least two of the specified configuration options and wherein the specified configuration options include operating system options, multipathing software options, volume options, array options, snapshot type options, and dataset options, wherein the dataset options comprise at least one of a small dataset, a medium dataset, and a large dataset that are differentiated from each other based on a number of directories to be created in a datatree, a depth of the datatree, a number of files to be created in each directory, and a size of each file to be created;
populate a test case suite, the populating comprising generating an instance of a test case for each combination of the specified configuration options;
parse the test case from the test case suite to identify script instructions to test an application for each combination of the configuration options;
create volumes based on received user input that specifies selection from volume options, wherein the selected volume options comprise at least two of a managed volume, an unmanaged volume, and a raw volume;
create data required for backup based on user input that specifies dataset options;
determine if a computer is setup for each combination of the specified configuration options, including the selected volume options;
execute the identified script instructions to test the application for each combination of the specified configuration options, including the selected volume options, in response to a determination that the computer is setup for each combination of the specified configuration options, the executing comprising traversing the generated instances of the test case;
log a result of executing the script instructions for each combination of the specified configuration options, including the selected volume options; and
output the result via an output device.

16. The computer program product of claim 15 further comprising instructions to terminate testing of the application in response to a determination that the computer is not setup for each combination of the configuration options.

17. The computer program product of claim 15 wherein the configuration options specified by user input are stored in a configuration file.

18. The computer program product of claim 15 further comprising instructions to receive user input and populate a test case suite based on each combination of the configuration options is initiated via a command line interface.

19. The computer program product of claim 15 further comprising instructions to generate application test data for the computer.

20. The computer program product of claim 15 wherein the result identifies which combination of configurations failed to execute the application properly, which script instruction identified a failure, and when the failure occurred within a sequence of script instructions.

* * * * *